United States Patent
Suzuki et al.

(10) Patent No.: US 9,641,397 B2
(45) Date of Patent: May 2, 2017

(54) COMMUNICATION SYSTEM, CONTROL APPARATUS, CONTROL METHOD, AND PROGRAM

(71) Applicant: NEC Corporation, Tokyo (JP)

(72) Inventors: Kazuya Suzuki, Tokyo (JP); Hideyuki Shimonishi, Tokyo (JP); Yohei Iizawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/429,749

(22) PCT Filed: Sep. 27, 2013

(86) PCT No.: PCT/JP2013/005777
§ 371 (c)(1),
(2) Date: Mar. 19, 2015

(87) PCT Pub. No.: WO2014/050143
PCT Pub. Date: Apr. 3, 2014

(65) Prior Publication Data
US 2015/0236919 A1    Aug. 20, 2015

(30) Foreign Application Priority Data

Sep. 28, 2012 (JP) ................................. 2012-217853

(51) Int. Cl.
*H04L 12/707* (2013.01)
*H04L 12/24* (2006.01)
*H04Q 11/00* (2006.01)

(52) U.S. Cl.
CPC .......... *H04L 41/12* (2013.01); *H04L 41/0816* (2013.01); *H04L 45/22* (2013.01);
(Continued)

(58) Field of Classification Search
None
See application file for complete search history.

(56) References Cited

U.S. PATENT DOCUMENTS 6,396,815 B1 * 5/2002 Greaves .................. H04L 45/00
370/256
7,177,951 B1 * 2/2007 Dykeman ........... H04L 61/6004
709/238

(Continued)

FOREIGN PATENT DOCUMENTS

EP    2 157 736 A1    2/2010
JP    2008-211551 A   9/2008
(Continued)

OTHER PUBLICATIONS

Extended European Search Report dated Apr. 29, 2016.
(Continued)

*Primary Examiner* — Bunjob Jaroenchonwanit
(74) *Attorney, Agent, or Firm* — McGinn IP Law Group, PLLC.

(57) ABSTRACT

A communication system includes a first control unit configured to change setting of a communication node(s) belonging to a first hierarchical network, in response to a setting request for the first hierarchical network and to change a topology of a second hierarchical network formed by using the first hierarchical network, and a second control unit configured to change setting of a communication node(s) belonging to the second hierarchical network, using the topology of the second hierarchical network after the change.

19 Claims, 12 Drawing Sheets

(52) U.S. Cl.
CPC ... *H04Q 11/0066* (2013.01); *H04Q 2011/009* (2013.01); *H04Q 2011/0081* (2013.01)

(56) References Cited

U.S. PATENT DOCUMENTS

| | | | | |
|---|---|---|---|---|
| 7,756,046 | B2 | 7/2010 | Habu et al. | |
| 8,238,325 | B2* | 8/2012 | Hayakawa | H04J 14/0227 370/352 |
| 8,270,306 | B2* | 9/2012 | Oguro | H04L 41/0631 370/242 |
| 8,595,571 | B2* | 11/2013 | Yasuie | H04L 41/0645 370/235 |
| 2002/0118685 | A1* | 8/2002 | Linnell | G06F 3/0613 370/400 |
| 2003/0026525 | A1* | 2/2003 | Alvarez | H04Q 11/0005 385/16 |
| 2003/0105881 | A1* | 6/2003 | Symons | H04L 29/06 709/249 |
| 2003/0137937 | A1* | 7/2003 | Tsukishima | H04J 3/1682 370/230 |
| 2003/0169684 | A1* | 9/2003 | Yamanaka | H04Q 11/0062 370/216 |
| 2003/0179716 | A1 | 9/2003 | Liu | |
| 2006/0126642 | A1* | 6/2006 | Kojima | H04L 45/04 370/395.52 |
| 2007/0214242 | A1* | 9/2007 | Watanabe | H04L 41/12 709/220 |
| 2007/0258476 | A1* | 11/2007 | Habu | H04L 41/0668 370/410 |
| 2009/0003211 | A1* | 1/2009 | Akyamac | H04J 14/0284 370/235 |
| 2009/0282246 | A1* | 11/2009 | Gunther | H04L 63/062 713/168 |
| 2010/0191848 | A1* | 7/2010 | Fujita | H04L 45/02 709/224 |
| 2011/0161378 | A1* | 6/2011 | Williamson | G06F 17/30961 707/812 |
| 2011/0206019 | A1* | 8/2011 | Zhai | H04W 56/00 370/336 |
| 2011/0222435 | A1* | 9/2011 | Zou | H04L 45/18 370/254 |
| 2011/0252096 | A1* | 10/2011 | Ramaswamy | H04L 41/12 709/206 |
| 2011/0313586 | A1* | 12/2011 | Popescu | H02J 13/0006 700/295 |
| 2012/0185229 | A1* | 7/2012 | Perrett | G06N 3/126 703/13 |
| 2013/0094478 | A1* | 4/2013 | Kim | H04W 72/005 370/336 |
| 2013/0100951 | A1 | 4/2013 | Ishizuka | |
| 2013/0176988 | A1* | 7/2013 | Wang | H04W 28/08 370/331 |
| 2013/0212246 | A1* | 8/2013 | Koponen | G06F 9/45558 709/223 |
| 2013/0346584 | A1* | 12/2013 | Tameshige | G06F 9/5077 709/223 |
| 2015/0195250 | A1* | 7/2015 | Barda | H04L 63/0236 726/13 |
| 2015/0215786 | A1* | 7/2015 | Raleigh | G06Q 10/06375 455/411 |
| 2016/0028654 | A1* | 1/2016 | Tripathi | H04L 49/25 370/355 |

FOREIGN PATENT DOCUMENTS

| | | |
|---|---|---|
| WO | WO 2004/071033 A1 | 8/2004 |
| WO | WO 2006/046309 A1 | 5/2006 |
| WO | WO 2011/162215 A1 | 12/2011 |
| WO | WO 2012/090993 A1 | 7/2012 |

OTHER PUBLICATIONS

International Search Report (ISR) (PCT Form PCT/ISA/210), in PCT/JP2013/005777, dated Dec. 3, 2013.

Nick McKeown, et. al., "OpenFlow: Enabling Innovation in Campus Networks," [online], [searched on May 31, 2012], the Internet <URL: http://www.openflow.org/documents/openflow-wp-latest.pdf>.

"OpenFlow Switch Specification" Version 1.1.0 Implemented (Wire Protocol 0x02), [online], [searched on May 31, 2012], the Internet <URL:http://www.openflow.org/documents/openflow-spec-v1.1.0.pdf>.

* cited by examiner

FIG. 6

| NODE | MATCHING CONDITION | ACTION PROCESS |
|---|---|---|
| 2 | WAVELENGTH OF λ1 RECEIVED THROUGH PORT 1 | TRANFER PROCESSING TO UPPER LAYER |
| 2 | WAVELENGTH OF λ2 RECEIVED THROUGH PORT 1 | OUTPUT FROM PORT 2 THROUGH PATH OF WAVELENGTH OF λ2 |
| 3 | WAVELENGTH OF λ2 RECEIVED THROUGH PORT 1 | TRANFER PROCESSING TO UPPER LAYER |
| 4 | WAVELENGTH OF λ3 RECEIVED THROUGH PORT 1 | TRANFER PROCESSING TO UPPER LAYER |

| NODE | MATCHING CONDITION | ACTION |
|---|---|---|
| 1 | DESTINATION A | OUTPUT FROM PORT 1 THROUGH PATH OF WAVELENGTH $\lambda 1$ |
| 1 | DESTINATION B | OUTPUT FROM PORT 1 THROUGH PATH OF WAVELENGTH $\lambda 2$ |
| 1 | DESTINATION C | OUTPUT FROM PORT 2 THROUGH PATH OF WAVELENGTH $\lambda 3$ |
| 2 | DESTINATION A | OUTPUT FROM PORT 3 TO ROUTER X |
| 3 | DESTINATION B | OUTPUT FROM PORT 2 TO DESTINATION B |
| : | | : |

COMMUNICATION SYSTEM, CONTROL APPARATUS, CONTROL METHOD, AND PROGRAM

TECHNICAL FIELD

Cross-Reference to Related Applications

The present invention is based upon and claims the benefit of the priority of Japanese Patent Application No. 2012-217853 (filed on Sep. 28, 2012), the disclosure of which is incorporated herein in its entirety by reference.

The present invention relates to a communication system, a control apparatus, a control method, and a program. More specifically, the invention relates to a communication system including a control apparatus configured to concentrically controlling a communication node, the control apparatus, a control method, and a program.

BACKGROUND

In recent years, the technology called OpenFlow (OpenFlow) is proposed (refer to Non Patent Literatures 1 and 2). OpenFlow identifies communications as end-to-end flows, and performs path control, failure recovery, load distribution, and optimization on a per-flow basis. An OpenFlow switch specified in Non Patent Literature 2 includes a secure channel for communication with an OpenFlow controller. The OpenFlow switch operates according to a flow table in which appropriate adding or rewriting is instructed by the OpenFlow controller. In the flow table, a set of a matching condition (Match Fields) to be matched against a packet header, flow statistics information (Counters), and instructions (instructions) defining processing content is defined for each flow (refer to section "4.1 Flow Table" in Non Patent Literature 2).

When the OpenFlow switch receives a packet, for example, the OpenFlow switch searches the flow table for an entry having a matching condition that matches header information of the received packet (refer to "4.3 Match Fields" in Non Patent Literature 2). When an entry that matches the received packet is found as a result of the search, the OpenFlow switch updates the flow statistics information (one or more Counters), and executes processing content (i.e., packet handling content, e.g., transmission of the packet from a specified port, flooding of the packet, discarding of the packet, or the like) described in the instruction field of the entry. On the other hand, when the entry that matches the received packet is not found as a result of the search, the OpenFlow switch transmits to the OpenFlow controller a request for setting the entry, or a request (Packet-In message) for transmitting control information for processing the received packet, through the secure channel. The OpenFlow switch receives the flow entry in which the processing content is defined, and then updates the flow table. In this manner, the OpenFlow switch performs packet forwarding by using the entry stored in the flow table as the control information.

Patent Literature 1 discloses an optical network system constituted from means for establishing optical paths, a plurality of optical edge routers configured to connect external IP networks to an optical network, and a plurality of optical cross-connect apparatuses including switching means for each optical path in order to connect the optical edge routers by the optical paths.

Patent Literature (PTL)

[PTL 1]
International Publication No. WO2004/071033

Non Patent Literature (NPL)

[NPL 1]
Nick McKeown and seven other authors, "OpenFlow: Enabling Innovation in Campus Networks", [on line], [Searched on July 13, Heisei 24 (2012)], Internet<URL: http://www.openflow.org/documents/openflow-wp-latest.pdf>.

[NPL 2]
"OpenFlow Switch Specification" Version 1.1.0 Implemented (Wire Protocol 0x02), [online] [Searched on July 13, Heisei 24 (2012)], Internet<URL: http://www.openflow.org/documents/openflow-spec-v1.1.0.pdf>.

SUMMARY

The entire disclosures of the above-listed Patent Literature and Non Patent Literatures are incorporated herein by reference.

The following analysis has been given by the present invention. By causing each of the optical cross-connect apparatus and the optical edge router in Patent Literature 1 to include a function corresponding to that of the OpenFlow switch of Non Patent Literatures 1 and 2, there can be constructed an optical IP network in which path control can be performed with a fine granularity.

In this case, it is necessary to grasp a logical network topology between these communication nodes in order for a control apparatus to appropriately execute control over the communication nodes. The logical network topology can be changed by stopping due to maintenance and inspection of each optical cross-connect apparatus or the like, new establishment of a path due to a band shortage, or the like as well.

The OpenFlow controller itself of Non Patent Literatures 1 and 2, however, does not include a function of detecting a change in the logical network topology. Thus, it is necessary for a network manager or the like to provide a change in the logical network topology to the OpenFlow controller for each change in the logical network topology, which may impose a great burden on management.

There may be conceived another method of grasping the network topology by causing an adjacent one of the communication nodes to perform information exchange, using a routing protocol such as OSPF (Open Shortest Path First) or BGP (Border Gateway Protocol). There is, however, a problem that this method would generate unnecessary traffic.

The above-mentioned problems are not specific to the optical IP network, but are problems common to a network where each of an upper hierarchical network and a lower hierarchical network is independently managed and controlled.

It is an object of the present invention to provide a communication system, a communication apparatus, a control apparatus, a control method of the communication apparatus, and a program capable of contributing to improvement of a path control function of the control apparatus represented by the OpenFlow controller of Non Patent Literatures 1 and 2.

According to a first aspect, there is provided a communication system, comprising:

a first control unit configured to change setting of at least one of communication nodes belonging to a first hierarchical network and to change a topology of a second hierarchical network formed by using the first hierarchical network, in response to a setting request for the first hierarchical network; and a second control unit configured to change setting of a communication node(s) belonging to the second hierarchical network, using the topology of the second hierarchical network after the change.

According to a second aspect, there is provided a control apparatus, comprising:

a first control unit configured to change setting of at least one of communication nodes belonging to a first hierarchical network and to change a topology of a second hierarchical network formed by using the first hierarchical network, in response to a setting request for the first hierarchical network; and a second control unit configured to change setting of a communication node(s) belonging to the second hierarchical network, using the topology of the second hierarchical network after the change.

According to a third aspect, there is provided a control method of a communication system comprising:

a first control unit configured to change setting of at least one of communication nodes belonging to a first hierarchical network and to change a topology of a second hierarchical network formed by using the first hierarchical network, in response to a setting request for the first hierarchical network; and a second control unit configured to change setting of a communication node(s) belonging to the second hierarchical network, the control method comprising the steps of:

changing the setting of the communication node(s) belonging to the first hierarchical network and changing the topology of the second hierarchical network, in response to the request from the second control unit or a user; and changing the setting of the communication node(s) belonging to the second hierarchical network, using the topology of the second hierarchical network after the change. This method is associated with a specific machine, which is the control apparatus that controls the communication nodes belonging to the first and second hierarchical networks.

According to a fourth aspect, there is provided a program for a computer constituting a control apparatus comprising:

a first control unit configured to change setting of at least one of communication nodes belonging to a first hierarchical network and to change a topology of a second hierarchical network formed by using the first hierarchical network, in response to a setting request for the first hierarchical network; and a second control unit configured to change setting of a communication node(s) belonging to the second hierarchical network, the program causing the computer to execute the processes of:

changing the setting of the communication node(s) belonging to the first hierarchical network and changing the topology of the second hierarchical network, in response to the request from the second control unit or a user; and changing the setting of the communication node(s) belonging to the second hierarchical network, using the topology of the second hierarchical network after the change.

This program can be recorded in a computer-readable (non-transient) storage medium. That is, the present invention can also be embodied as a computer program product.

The meritorious effects of the present invention are summarized as follows.

The present invention can contribute to improvement of a path control function of the control apparatus, in particular, improvement of the path control function in accordance with a change in a logical network topology.

BRIEF DESCRIPTION OF DRAWINGS

FIG. 6 is a table showing examples of control information set in communication nodes in a lower layer in the first exemplary embodiment of the present disclosure.

PREFERRED MODES

Figure 1:
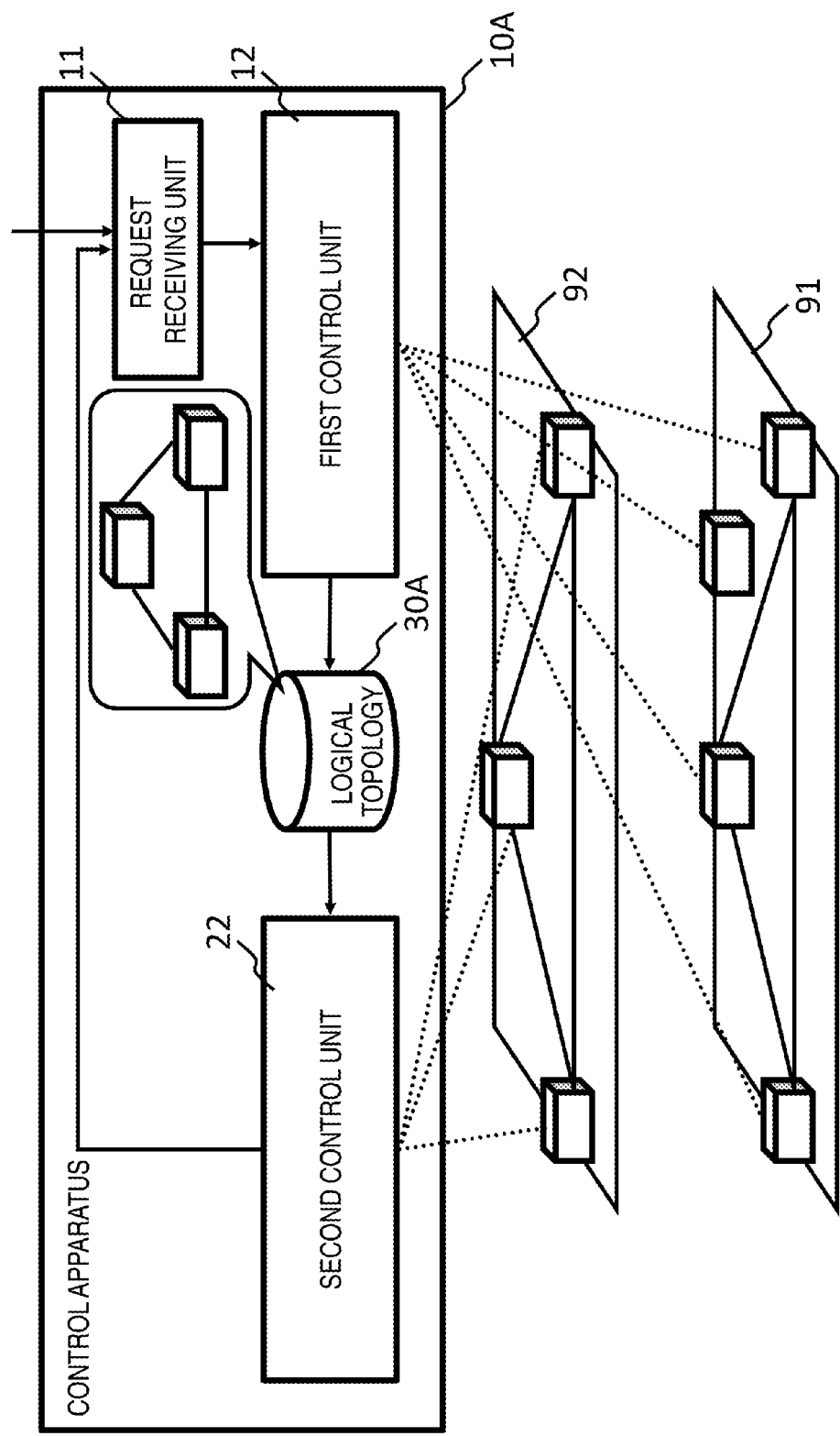
FIG. 1 is a diagram showing a configuration of an exemplary embodiment of the present disclosure.

First, an outline of an exemplary embodiment of the present disclosure will be described with reference to drawings. Reference signs in the drawings appended to this overview are appended to each element for convenience as an example of help understanding, and are not intended to limit the present disclosure to any mode that has been illustrated.

As shown in FIG. 1, the exemplary embodiment of the present disclosure can be implemented by a communication system including a first control unit 12 configured to control each communication node belonging to a first hierarchical network 91 and a second control unit 22 configured to control each communication node belonging to a second hierarchical network 92 formed by using the first hierarchical network by referring to a network topology (logical topology 30A in FIG. 1) constructed by the first control unit 12.

More specifically, the first control unit 12 changes setting of the communication node belonging to the first hierarchical network 91 in response to a request from the second control unit 22 or a user through a request receiving unit 11 and changes the topology (logical topology) of the second hierarchical network formed by using the first hierarchical network. The second control unit 22 changes setting of the communication node belonging to the second hierarchical network 92, using the topology (logical topology) of the second hierarchical network after the change.

Figure 2:
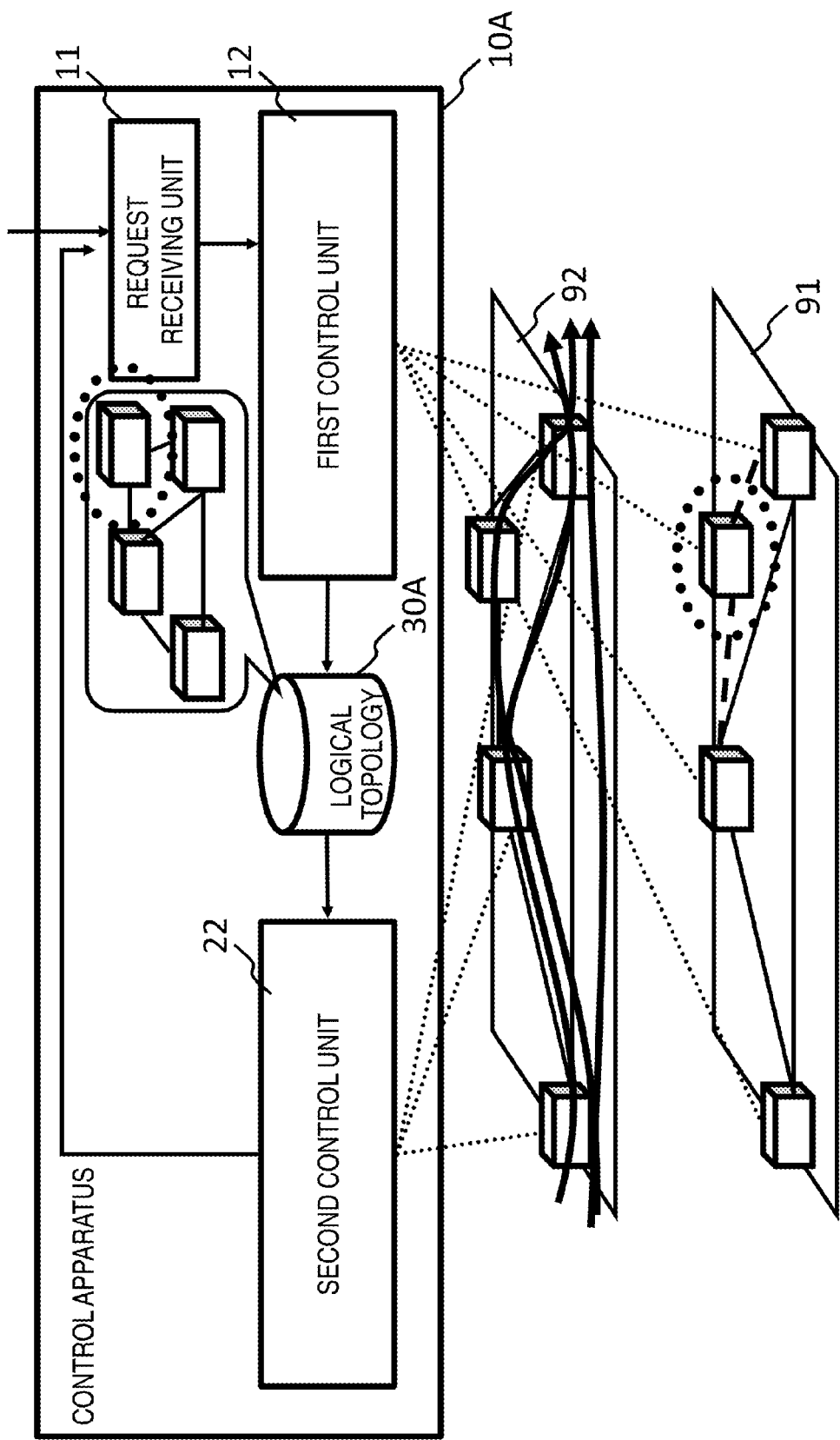
FIG. 2 is a diagram for explaining operations of the exemplary embodiment of the present disclosure.

When receiving a band addition request from the user, for example, the first control unit 12 sets control information in the communication node that is in an idle state in FIG. 1, and adds a new path, as shown in FIG. 2, for example. The second control unit 22 performs replacement of a path between hosts, flow distribution, or like in the second hierarchical network 92, using the topology of the second hierarchical network after addition of the new path.

With the above arrangement, improvement in a path control function of the control apparatus, in particular, in the path control function in accordance with a change in the logical network topology is implemented.

First Exemplary Embodiment

Figure 3:
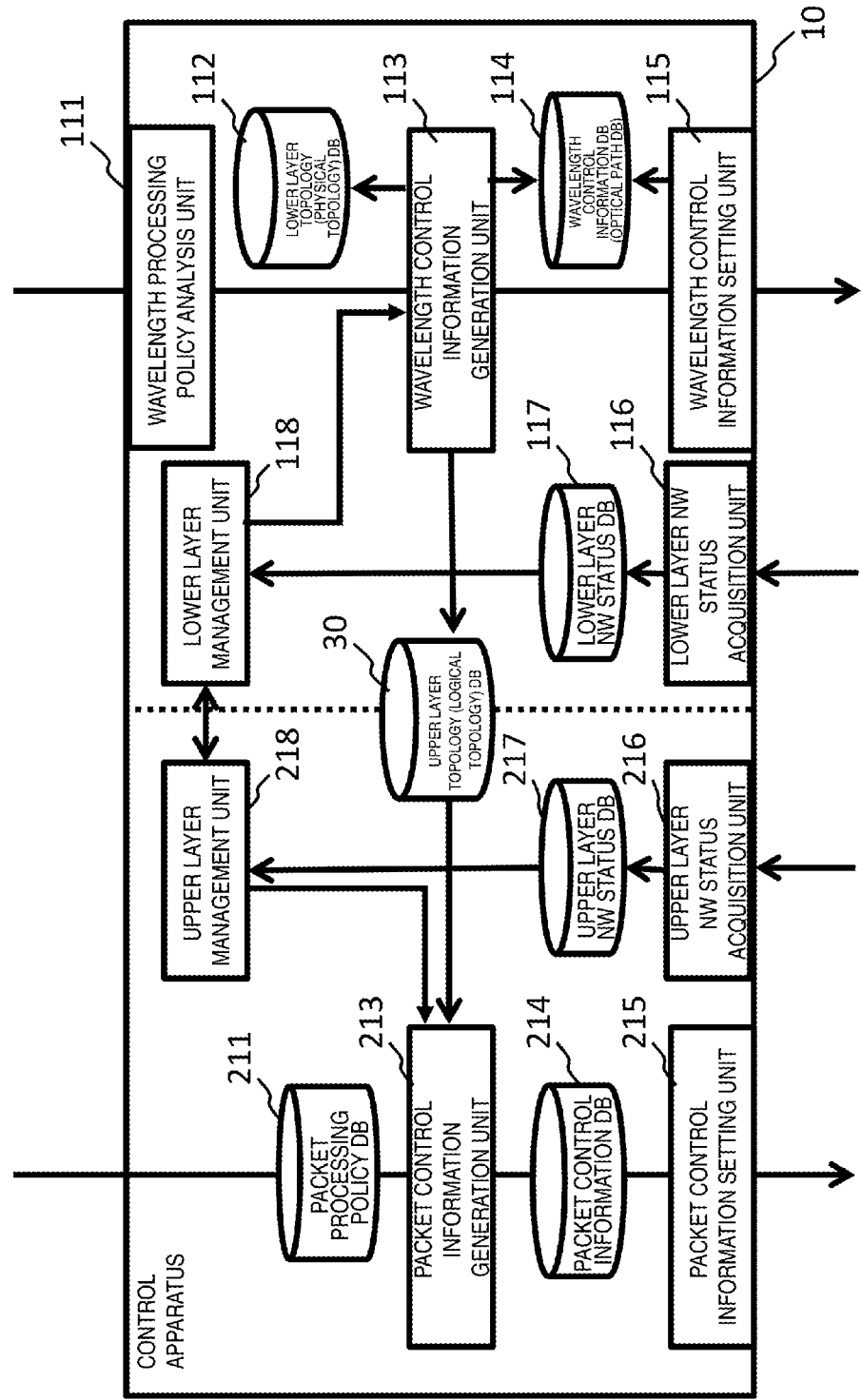
FIG. 3 is a diagram showing a configuration of a control apparatus in the first exemplary embodiment of the present disclosure.

Next, a detailed description will be given about a first exemplary embodiment in which the present disclosure is applied to an optical IP network, with reference to drawings. FIG. 3 is a diagram showing a configuration of a control apparatus in the first exemplary embodiment of the present disclosure. Referring to FIG. 3, the configuration including a wavelength processing policy analysis unit 111, a lower layer topology (physical topology) database (database being hereinafter referred to as a "DB") 112, a wavelength control information generation unit 113, a wavelength control information DB (optical path DB) 114, a wavelength control information setting unit 115, a lower layer network status acquisition unit (network being hereinafter also referred to as an "NW") 116, a lower layer NW status DB 117, a lower layer management unit 118, an upper layer topology (logical topology) DB 30, a packet processing policy DB 211, a packet control information generation unit 213, a packet control information DB 214, a packet control information setting unit 215, an upper layer NW status acquisition unit 216, an upper layer NW status DB 217, and an upper layer management unit 218 is shown.

The wavelength processing policy analysis unit 111, the lower layer topology DB 112, the wavelength control information generation unit 113, the wavelength control information DB 114, the wavelength control information setting unit 115, the lower layer NW status acquisition unit 116, the lower layer NW status DB 117, and the lower layer management unit 118 on the right side of the configuration in FIG. 3 correspond to a first control unit. The packet processing policy DB 211, the packet control information generation unit 213, the packet control information DB 214, the packet control information setting unit 215, the upper layer NW status acquisition unit 216, the upper layer NW status DB 217, and the upper layer management unit 218 on the left side of the configuration in FIG. 3 correspond to a second control unit.

The wavelength processing policy analysis unit 111 is means for receiving a wavelength processing policy from a user (network manager). As the wavelength processing policy supplied from the user, information on an end point of an optical path, the band of the optical path, a required delay, or the like, for example, may be pointed out. Besides that information, a request for stopping a communication node (such as optical cross-connect apparatus) of an optical network that is a lower layer, for example, is also included. When receiving the wavelength processing policy, the optical length processing policy analysis unit 111 notifies the wavelength processing policy to the wavelength control information generation unit 113.

Figure 4:
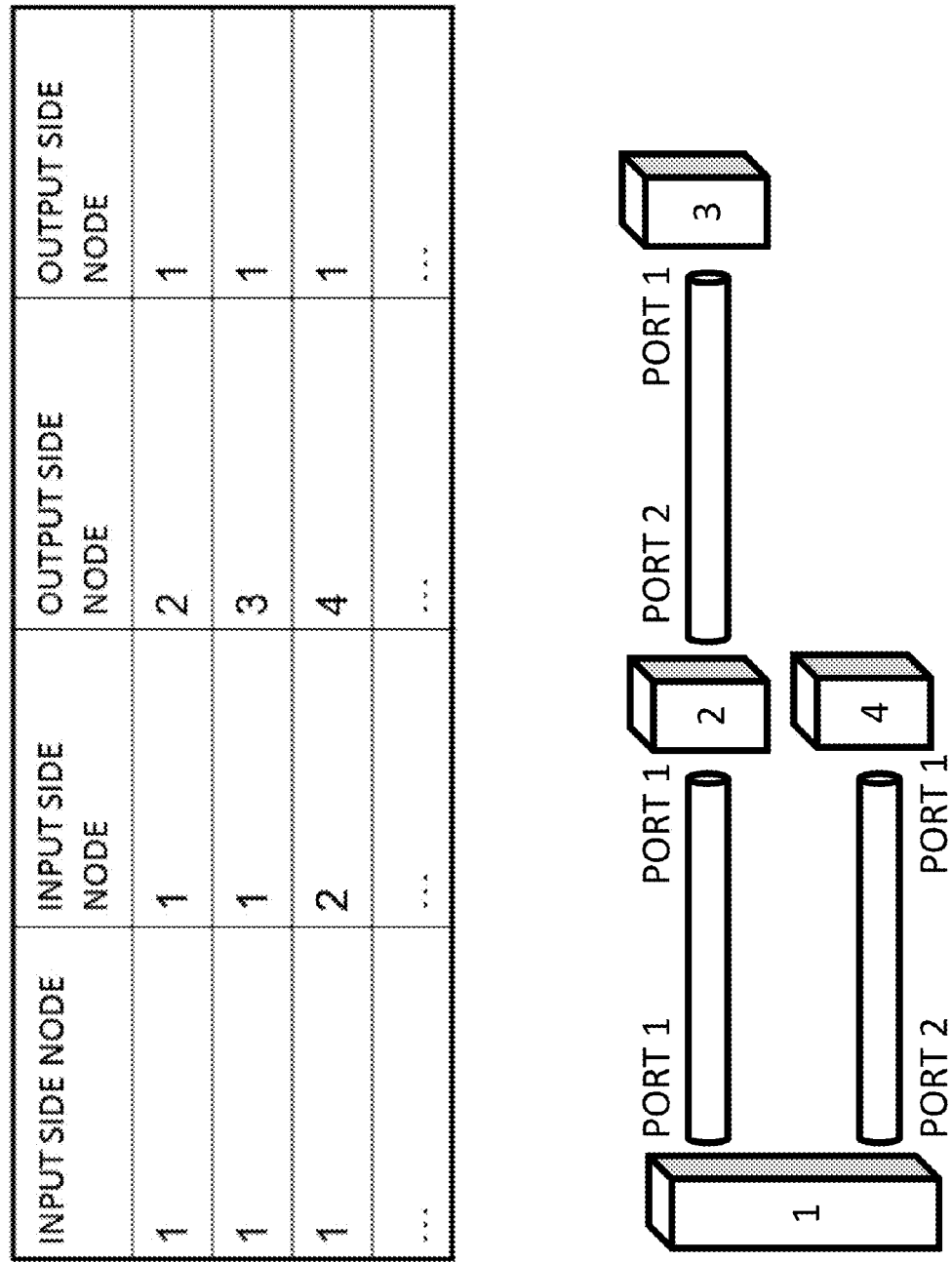
FIG. 4 includes a table and a diagram for explaining a lower layer topology (physical topology) held in the control apparatus in the first exemplary embodiment of the present disclosure.

The lower layer topology DB 112 is a database configured to store a physical topology formed by optical fiber links extended among communication nodes (optical cross-connect apparatuses or the like) of the optical network that is the lower layer. FIG. 4 includes a table showing a configuration of the lower layer topology (physical topology) stored in the lower layer topology DB 112. Examples in FIG. 4 represent connection relationships of communication nodes 1 to 4 in the lower stage of FIG. 4, using entries represented by pairs of the respective communication nodes 1 to 4 (input side nodes/output side nodes) and opposing ports of the respective communication nodes 1 to 4.

The wavelength control information generation unit 113 is means for generating wavelength control information to be set in each communication node in the lower layer network having the physical topology shown in FIG. 4, and then registering the wavelength control information in the wavelength control information DB (optical path DB) 114. Specifically, when receiving from the wavelength processing policy analysis unit 111 a list of optical paths associated with stop of one of the communication nodes, the wavelength control information generation unit 113 calculates alternative paths each having the same start and end points as those of each of the optical paths, generates the wavelength control information for implementing these alternative paths, and then registers the wavelength control information in the wavelength control information DB (optical path DB) 114. When receiving from the lower layer management unit 118 a request for adding a new optical path that specifies start and end points of the new optical path, the wavelength control information generation unit 113 calculates the new optical path having the start and end points, generates the wavelength control information for implementing this new optical path, and then registers the wavelength control information in the wavelength control information DB (optical path DB) 114. The wavelength control information generation unit 113 also updates an upper layer topology (logical topology) stored in the upper layer topology (logical topology) DB 30 when a change occurs in the upper layer topology (logical topology) due to the stop of the communication node or setting of the alternative optical paths/new optical path.

Figure 5:
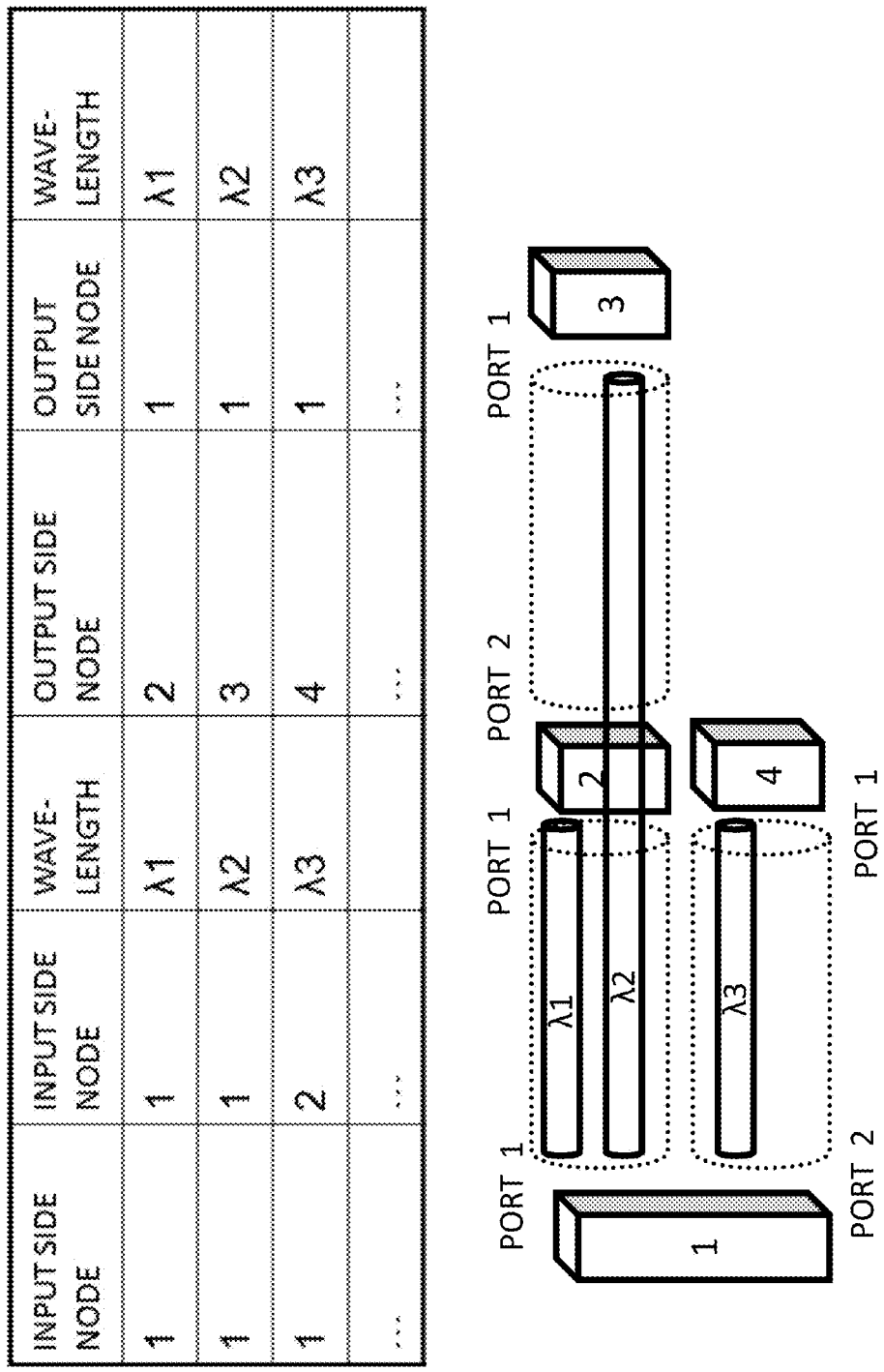
FIG. 5 includes a table and a diagram for explaining an upper layer topology (logical topology) held in the control apparatus in the first exemplary embodiment of the present disclosure.

The upper layer topology (logical topology) DB 30 is a database configured to store the topology (logical topology) of an upper layer network to be maintained and managed by the wavelength control information generation unit 113. FIG. 5 includes a table showing a configuration of the upper layer topology (logical topology) stored in the upper layer topology (logical topology) DB 30. Examples in FIG. 5 represent the logical topology among the communication nodes 1 to 4 connected by optical paths of wavelengths lambda n (n=1, 2, 3 . . . natural number) in the lower stage of FIG. 5, using entries represented by sets of the respective communication nodes 1 to 4 (input side nodes/output side nodes) and opposing ports of the respective communication nodes 1 to 4, and wavelength information.

The wavelength control information DB (optical path DB) 114 is a database configured to store control information associated with optical paths extended (linked) among the communication nodes (such as the optical cross-connect apparatuses) in the optical network that is the lower layer. FIG. 6 is a table showing examples of wavelength control information held in the wavelength control information DB (optical path DB) 114. Each example in FIG. 6 shows the wavelength control information that associates one of the communication nodes where the wavelength control information is to be set, a matching condition for identifying a flow at the node, and processing content (action) to be applied to the matching condition. To take an example, according to an uppermost entry in FIG. 6, the node 2 transfers a process to an upper layer when the node 2 receives an optical signal of a wavelength lambda 1 from a port 1 of the node 2. Herein, a packet process is executed in the upper layer, based on packet control information corresponding to a packet destination or the like, which will be described later. With this arrangement, the process of forwarding a packet having a destination A to the destination A through a router X is implemented. The packet has been received from the communication node 1 shown in the lower stage of FIG. 7.

When addition, change, deletion, or the like of an entry held in the wavelength control information DB (optical path DB) 114 is performed, the wavelength control information setting unit 115 executes setting, change, or deletion of the wavelength control information for each corresponding communication node, in synchronization with the content of addition, change, deletion or the like of the entry.

The lower layer NW status acquisition unit 116 is means for collecting traffic information from each communication node in the lower layer, a probe apparatus installed separately, or the like, and then registering the traffic information in the lower layer NW status DB 117.

The lower layer NW status DB 117 is a database configured to store the information for grasping a lower layer network status collected by the lower layer NW status acquisition unit 116. In this exemplary embodiment, the description will be given, assuming that a band usage rate for each optical path shown in FIG. 5 or the like is held in the lower layer NW status DB 117. The lower layer NW status DB 117, however, may be configured to hold the information obtained by execution of other various statistical processes.

The lower layer management unit 118 notifies an optical path change to the upper layer management unit 218, instructs the wavelength control information generation unit 113 to delete the wavelength control information based on notification from the upper layer management unit 218 about completion of setting of packet control information, makes a request for selecting a candidate for replacing an upper layer path to the upper layer management unit 218 based on a result of band usage rate monitoring, and the like.

Figure 7:
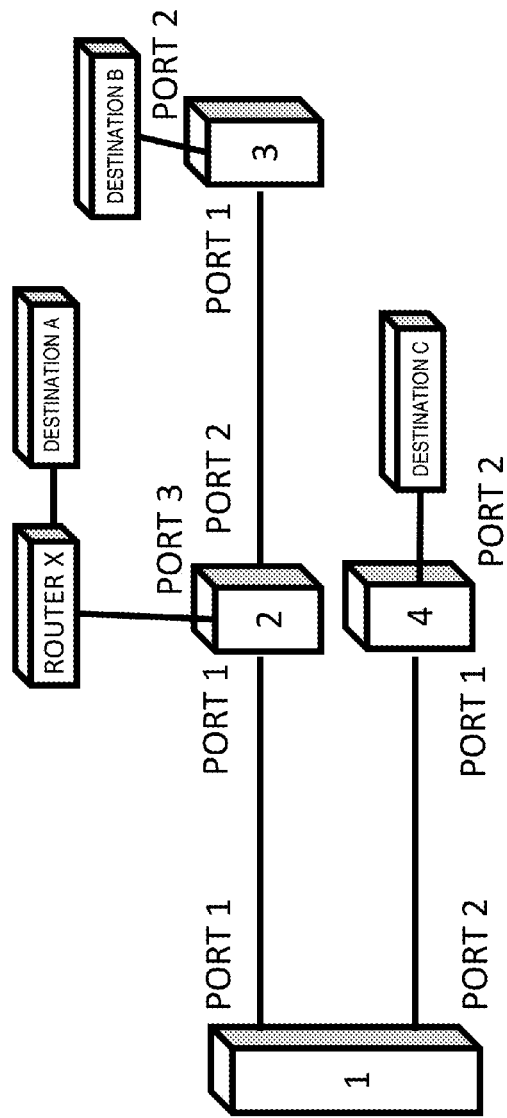
FIG. 7 includes a table and a diagram for explaining packet processing policies held in the control apparatus in the first exemplary embodiment of the present disclosure.

The packet processing policy DB 211 is a database configured to store a predetermined access policy, information on a path calculated based on the access policy and so forth, and the like. FIG. 7 includes a table showing examples of packet processing policies held in the packet processing policy DB 211. Each example in FIG. 7 shows an entry that associates a final output destination in the upper layer network and a forwarding destination (subsequent forwarding destination) from the output destination, for each destination of a packet.

When receiving notification of updating the upper layer topology from the upper layer management unit 218, the packet control information generation unit 213 calculates a path for each flow, based on the packet processing policy, the upper layer topology stored in the upper layer topology DB 30, and update content included in the notification of updating, and generates control information (packet control information) to be set in a forwarding node in the upper layer. The packet control information generation unit 213 also stores the generated control information (packet control information) in the packet control information DB 214. When receiving from the upper layer management unit 218 specification of one of the optical paths whose band usage rate exceeds a predetermined threshold value, the packet control information generation unit 213 checks the optical path with calculated paths (upper layer paths), selects one of the upper layer paths that passes through the optical path and having different start and end points, and then responds the selected upper layer path to the upper layer management unit 218.

Figure 8:
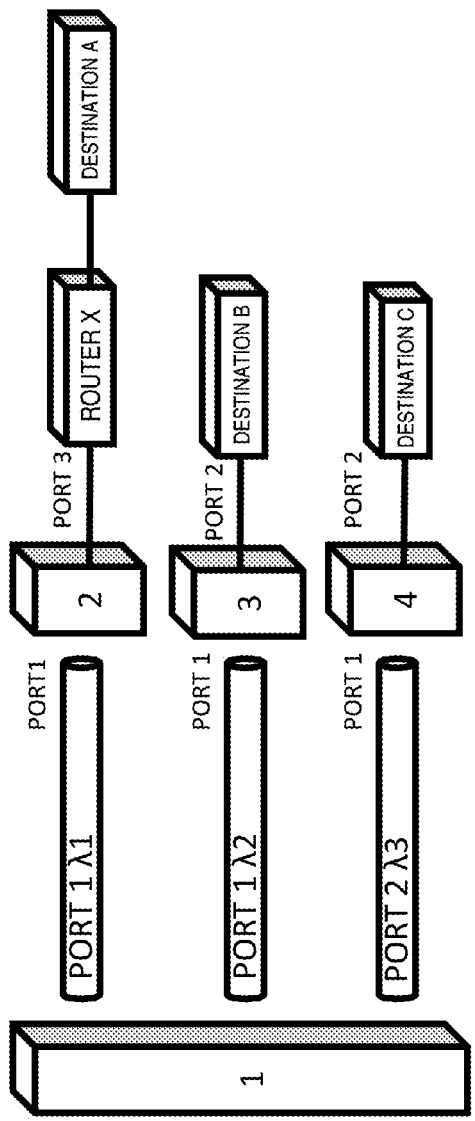
FIG. 8 includes a diagram and a table showing examples of control information set in communication nodes in an upper layer in the first exemplary embodiment of the present disclosure.

The packet control information DB 214 is a database configured to store the control information to be set in each communication node in the upper layer. FIG. 8 includes a table showing examples of the packet control information held in the packet control information DB 214. The examples in FIG. 8 show the packet control information each of which associates the communication node in which the packet control information is to be set, a matching condition for identifying a flow at the node, and processing content (action) to be applied to the matching condition. To take an example, according to an uppermost entry in FIG. 8, when receiving a packet having a destination A set therein, the node 1 outputs the packet from its port 1 to which the optical path of the wavelength lambda 1 is connected. With this arrangement, the processing of forwarding the packet with the destination A to the destination A through the router X is implemented. The packet has been received from the communication node 1 shown in the lower stage of FIG. 8.

When addition, change, deletion, or the like of an entry held in the packet control information DB 214 is performed, the packet control information setting unit 215 executes setting, change, or deletion of the packet control information in each corresponding communication node, in synchronization with the content of addition, change, deletion or the like of the entry.

The upper layer NW status acquisition unit 116 is means for collecting traffic information from each communication node in the upper layer, the probe apparatus installed separately, or the like, and then registering the traffic information in the upper layer NW status DB 217. The upper layer NW status acquisition unit 216 can also be implemented by a function of collecting flow statistics information stored in each OpenFlow switch. This function is included in an OpenFlow controller in Non Patent Literatures 1 and 2.

The upper layer NW status DB 217 is a database configured to store the information for grasping an upper layer network status collected by the upper layer NW status acquisition unit 216.

The upper layer management unit 218 receives and responds to the notification of the optical path change from the lower layer management unit 118, the notification of completion of setting of the packet control information for the upper layer to the lower layer management unit 118, the request for selecting the candidate for replacing the upper layer path from the lower layer management unit 118, and the like.

Each unit (processing means) of the control apparatus shown in FIG. 3 can also be implemented by a computer program that causes a computer constituting the control apparatus to execute each process described above.

Figure 9:
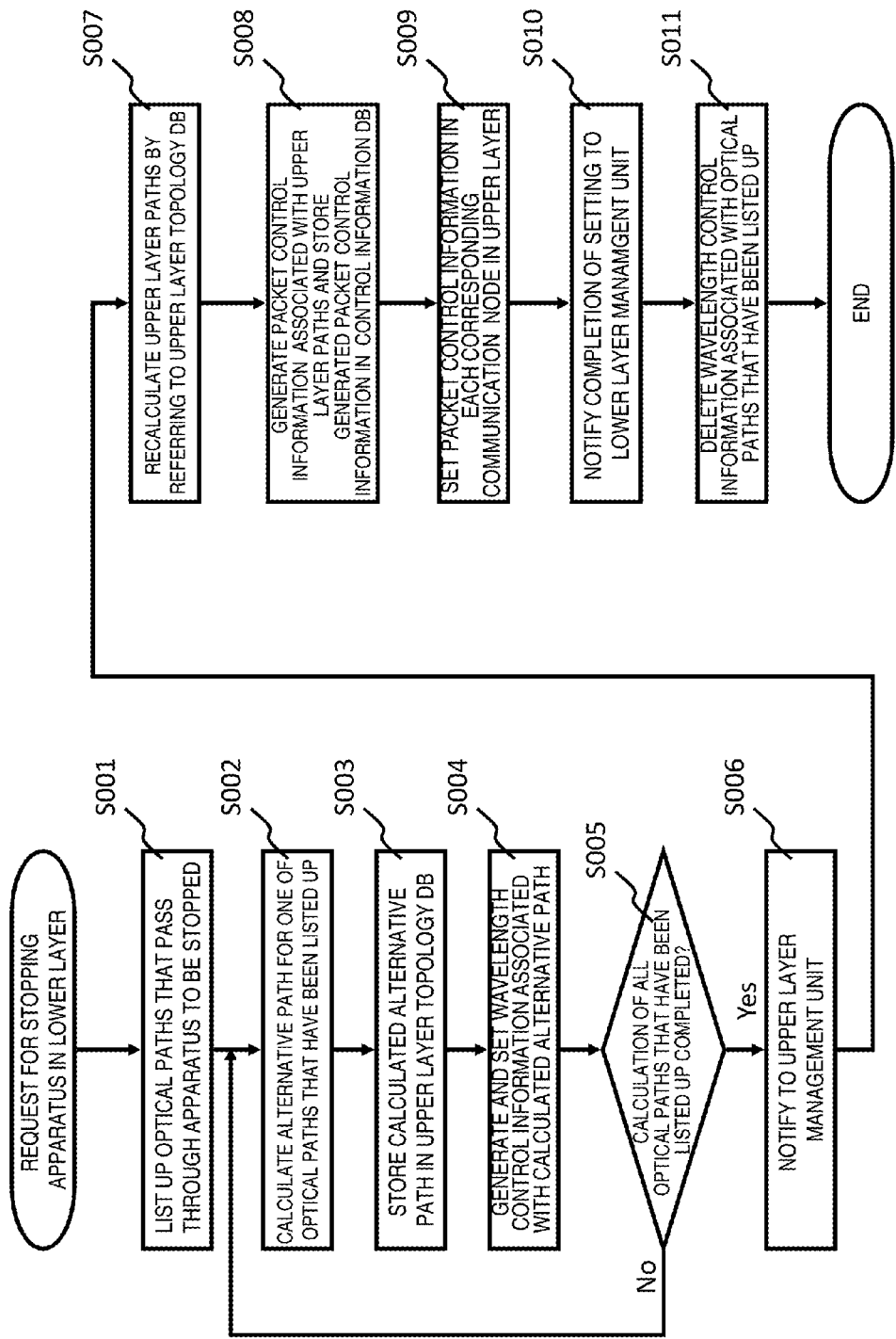
FIG. 9 is a flowchart showing operations of the control apparatus (in response to a request for stopping an apparatus in the lower layer) in the first exemplary embodiment of the present disclosure.

Next, operations of this exemplary embodiment will be described in detail with reference to drawings. First, the description will be directed to a cooperative operation between the upper layer and the lower layer when the control apparatus receives a request for stopping one of the communication nodes in the lower layer. FIG. 9 is a flowchart showing operations of the control apparatus when the control apparatus receives at the wavelength processing policy analysis unit 111 the request for stopping the communication node in the lower layer.

Referring to FIG. 9, the wavelength processing policy analysis unit 111 notifies to the wavelength control information generation unit 113 the communication node in the lower layer for which the request for stopping has been made. The wavelength control information generation unit 113 refers to the wavelength control information DB 114 to list up the optical paths that pass through the communication node to be stopped (in step S001). Each optical path that passes through the communication node to be stopped can be identified by searching the wavelength control information DB 114 for the wavelength control information set in the communication node to be stopped and then searching the upper layer topology DB 30 for the corresponding optical path.

The wavelength control information generation unit 113 selects one of the optical paths for which alternative path calculation has not been completed from among the optical paths that have been listed up, and calculates an alternative path having same start and end points as those of the selected optical path (in step S002). Specifically, the wavelength control information generation unit 113 excludes the communication node to be stopped from the physical topology stored in the lower layer topology DB 112 and then performs the path calculation. The alternative path can be thereby obtained.

Next, the wavelength control information generation unit 113 stores the calculated alternative path in the upper layer topology DB 30 (in step S003).

Then, the wavelength control information generation unit 113 generates wavelength control information (refer to FIG. 6) for forming the alternative path, and then registers the wavelength control information in the wavelength control information DB 114. The wavelength control information setting unit 115 sets a wavelength processing rule added to the wavelength control information DB 114 in each corresponding communication node (in step S004).

When calculation of alternative paths for all the optical paths that have been listed up in step S001 is not completed (No in step S005), the procedure returns to step S002 to repeat alternative path calculation. On the other hand, calculation of alternative paths for all the optical paths that have been listed up in step S001 is completed (Yes in step S005), the wavelength control information generation unit 113 notifies all the optical paths that have been listed up in step S001 to the upper layer management unit 218 through the lower layer management unit 118 to cause the upper layer management unit 218 to start path replacement in the upper layer (in step S006).

When receiving the notification, the upper layer management unit 218 notifies to the packet control information generation unit 213 the optical paths to be stopped that have been notified from the lower layer management unit 118, and instructs the path replacement in the upper layer. The packet control information generation unit 213 performs recalculation of existent paths, using a topology obtained by excluding the optical paths notified from the lower layer management unit 118 from the logical topology stored in the upper layer topology DB 30 (in step S007).

Next, the packet control information generation unit 213 generates the packet control information for causing packet forwarding along the paths obtained by the recalculation to be executed, and then stores the packet control information in the packet control information DB 214 (in step S008).

Then, the packet control information setting unit 215 refers to the packet control information DB 214 to set the newly added packet control information in each communication node on each corresponding path in the upper layer (in step S009).

When the above-mentioned processes are completed, the upper layer management unit 218 notifies to the lower layer management unit 118 completion of the process of the path replacement in the upper layer (in step S010).

When receiving from the upper layer management unit 218 the notification of completion of the path replacement process in the upper layer, the lower layer management unit 118 instructs the wavelength control information generation unit 113 to delete from the wavelength control information DB 114 the wavelength control information for forming the optical paths that have been listed up in step S001. When deletion of the wavelength control information is performed by the wavelength control information generation unit 113, the wavelength control information setting unit 115 deletes from the corresponding communication nodes wavelength processing rules that have been deleted from the wavelength control information DB 114 (in step S011).

With the above-mentioned arrangement, traffic in the upper layer that uses the optical paths to be stopped can be rapidly detoured.

Figure 10:
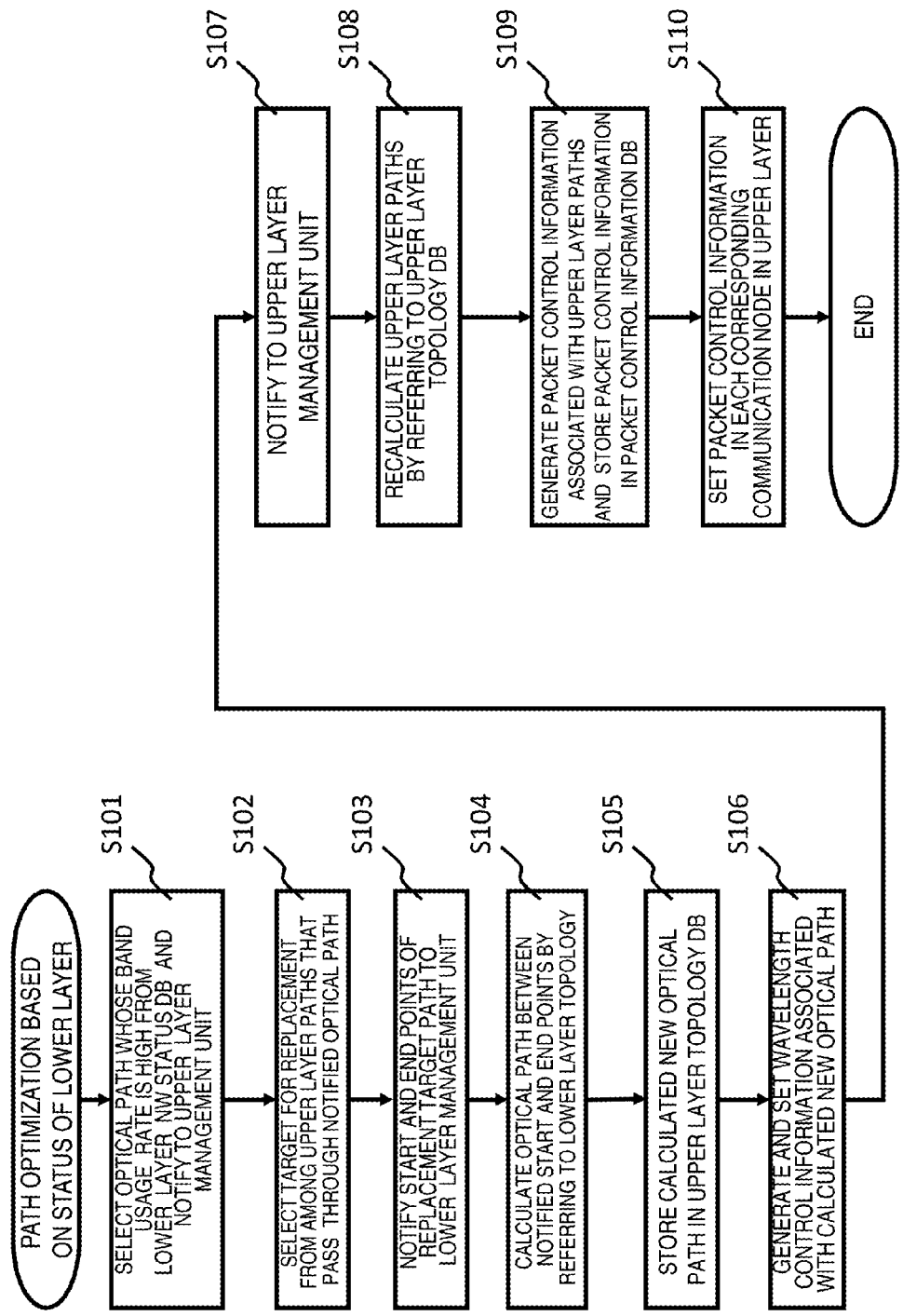
FIG. 10 is a flowchart showing operations of the control apparatus (for path optimization based on the status of the lower layer) in the first exemplary embodiment of the present disclosure.

Next, a description will be directed to an example where the upper layer and the low layer perform a cooperative operation, according to the status of traffic or an increase in processing load. FIG. 10 is a flowchart showing operations of the control apparatus when performing path optimization based on the status of the lower layer.

Referring to FIG. 10, when one of the optical paths whose band usage rate exceeds a predetermined threshold value is found as a result of monitoring using the lower layer NW status DB 117, the lower layer management unit 118 first specifies the optical path and notifies the upper layer management unit 218 to select a candidate for replacement of an upper layer path (in step S101).

The upper layer management unit 218 forwards the notification from the lower layer management unit 118 to the packet control information generation unit 213. The packet control information generation unit 213 refers to the packet control information DB 214 to select one of the upper layer paths that pass through the notified optical path, of which at least one of start and end points is different from that of the optical path, as a target for replacement (in step S102).

Figure 11:
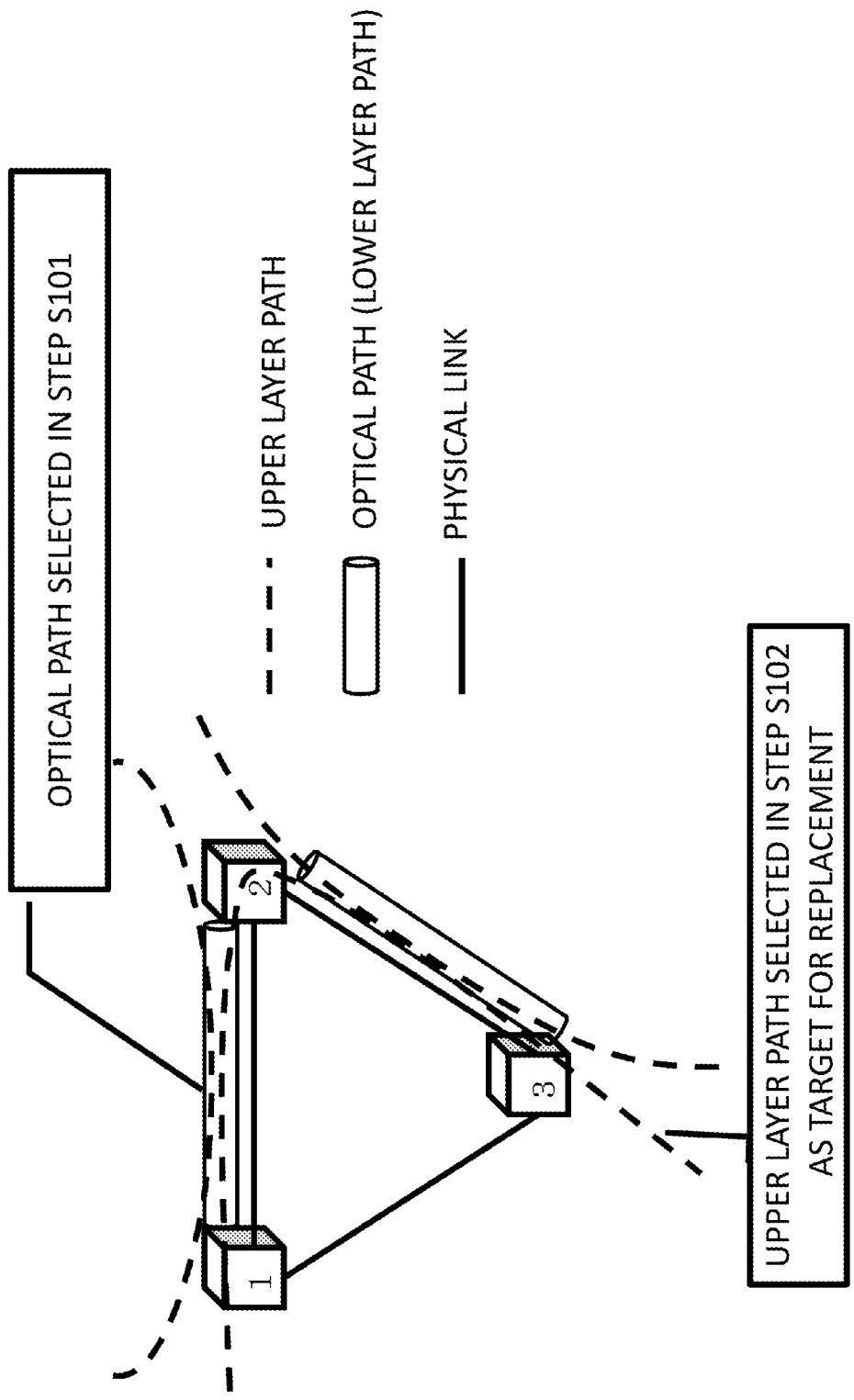
FIG. 11 is a diagram for explaining steps S101 and S102 in FIG. 10.

FIG. 11 is a diagram for explaining steps S101 and S102. Assume, for example, that, among optical paths in FIG. 11, the band usage rate of the optical path between a communication node #1 and a communication node #2 is high. Then, the optical path between the communication node #1 and the communication node #2 is selected in step S101. In this case, the lower layer management unit 118 specifies the optical path between the communication node #1 and the communication node #2, and then notifies the upper layer management unit 218 to select the candidate for replacement of the upper layer path (in step S101). The packet control information generation unit 213 that has received the notification through the upper layer management unit 218 selects, from among upper layer paths indicated by broken lines in FIG. 11, the upper layer path that passes through the communication node #1, the communication node #2, and a communication node #3, as the target for replacement (in step S102).

The packet control information generation unit 213 notifies the start and end points of the upper layer path determined in step S102 to the lower layer management unit 118 through the upper layer management unit 218 (in step S103).

The lower layer management unit 118 forwards the notification from the upper layer management unit 218 to the wavelength control information generation unit 113. The wavelength control information generation unit 113 calculates a path between the notified start and end points, using the physical topology stored in the lower layer topology DB 112, thereby determining the optical path to be newly added (in step S104).

Next, the wavelength control information generation unit 113 registers the calculated new optical path in the upper layer topology DB 300 (in step S105). The wavelength control information generation unit 113 generates the wavelength control information (refer to FIG. 6) for forming the calculated new optical path, and then registers the generated wavelength control information in the wavelength control information DB 114. The wavelength control information setting unit 115 sets a wavelength processing rule added to the wavelength control information DB 114 to each corresponding communication node (in step S106).

Next, the wavelength control information generation unit 113 notifies the optical path added to the upper layer topology DB 30 in step S105 to the upper layer management unit 218 through the lower layer management unit 118, thereby causing the upper layer management unit 218 to start path replacement in the upper layer (in step S107).

When receiving the notification, the upper layer management unit 218 notifies to the packet control information generation unit 213 the new optical path notified from the lower layer management unit 118 and instructs the packet control information generation unit 213 to perform the path replacement in the upper layer. The packet control information generation unit 213 performs recalculation of the existent paths, using the logical topology stored in the upper layer topology DB 30 (in step S108).

Next, the packet control information generation unit 213 generates the packet control information for causing the communication nodes in the upper layer to perform packet forwarding along the paths obtained by the recalculation, and then stores the packet control information in the packet control information DB 214 (in step S109).

Then, the packet control information setting unit 215 refers to the packet control information DB 214 and then sets the newly added packet control information in each communication node on the corresponding path in the upper layer (in step S110).

Figure 12:
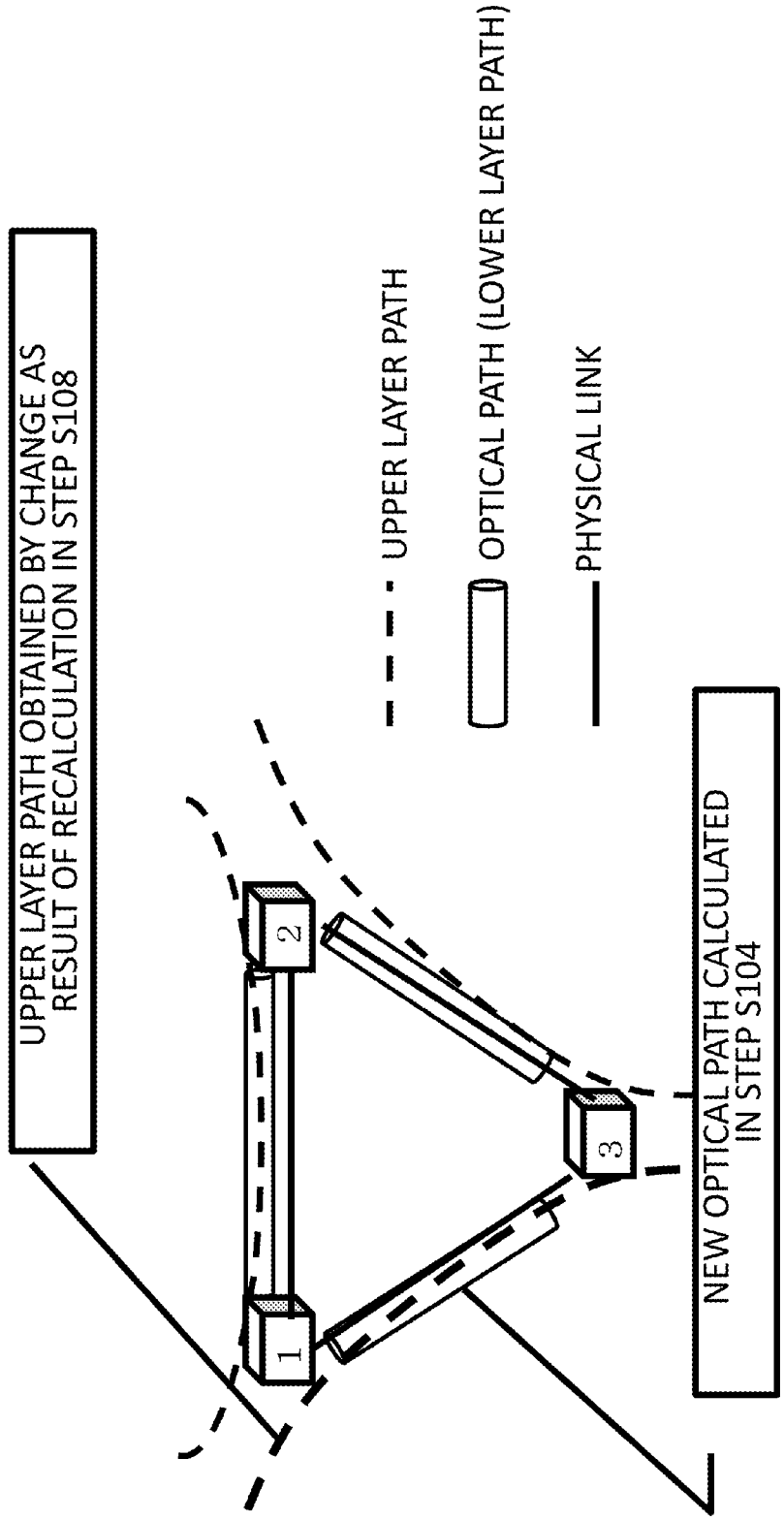
FIG. 12 is a diagram for explaining step S104 in FIG. 10.

FIG. 12 is a diagram for explaining processes after step S104 in FIG. 10. In the example in FIG. 12, addition of the new optical path between the communication node #1 and the communication node #3 that are the notified start and end points is determined. Then, the packet control information generation unit 213 performs recalculation of the existent paths in the upper layer, by referring to the logical topology including the added optical path. In the example in FIG. 12, replacement by an upper layer path between the communication node #1 and the communication node #3 is performed to use the optical path between the communication node #1 and the communication node #3, without passing through the communication node #2.

With the above-mentioned arrangement, addition of the new path in consideration of traffic in the lower layer and replacement of the upper layer path according to the addition of the new path is performed. According to this exemplary embodiment, it is not necessary to perform information exchange between an adjacent one of the communication nodes in order to grasp a change in the upper layer topology.

The above description was given about the exemplary embodiment of the present invention. The present invention, is not, however, limited to the above-mentioned exemplary embodiment. Further variations, substitutions, and adjustments may be added within a scope without departing from the basic technical concept of the present invention. To take an example, the network configuration and the configurations of elements shown in each drawing are an example for helping understanding of the present invention, and the present invention is not limited to those shown in these drawings.

In the example shown in FIG. 12, for example, the description was given, assuming that the lower layer management unit 118 selects the optical path with a high band usage rate by referring to the lower layer NW status DB 117. A configuration can also be adopted where the upper layer management unit 218 identifies one of the upper layer paths where congestion or the like has occurred by referring to the upper layer NW status DB 217, and requests the lower layer management unit 218 to add an optical path. Further, other information such as information on a load on each switch can also be used, in place of the band usage rate. When it is clear that traffic in a specific segment will increase at a certain specific date based on the statistics information or the like, the lower layer management unit 118 may voluntarily add an optical path.

Finally, preferred modes of the present invention are summarized.

<First Mode>
(See the communication system according to the first aspect described above).

<Second Mode>
In the communication system in the first mode,
the first control unit changes the setting of the communication node belonging to the first hierarchical network and changes the topology of the second hierarchical network, in response to the request from the second control unit or a user.

<Third Mode>
In the communication system in the first or second mode, the first control unit further comprises a first management unit configured to notify the change of the topology of the second hierarchical network to the second control unit; and
the second control unit further comprises a second management unit configured to request the first control unit to add a path to the first hierarchical network.

<Fourth Mode>
In the communication system in any one of the first to third modes,
the first control unit adds the new path between start and end points notified from the second control unit.

<Fifth Mode>
In the communication system in the fourth mode,
the second control unit selects a replacement target path from among upper layer paths that uses a lower layer path specified from the first control unit, and notifies start and end points of the replacement target path to the first control unit.

<Sixth Mode>
In the communication system in the fifth mode, the first control unit further comprises:
a first status acquisition unit configured to obtain a status of the first hierarchical network; and
the first control unit specifies to the second control unit the lower layer path for which the replacement target path is demanded, based on the status of the first hierarchical network.

<Seventh Mode>
In the communication system in any one of the fourth to sixth modes,
the second control unit further comprises:
a second status acquisition unit configured to obtain a status of the second hierarchical network; and
the second control unit determines the start and end points to be specified to the first control unit, based on the status of the second hierarchical network.
<Eighth Mode>
In the communication system in any one of the first to seventh modes,
the first control unit sets an alternative path in the second hierarchical network according to the request from the user for stopping the communication node belonging to the first hierarchical network.
<Ninth Mode>
In the communication system in the eighth mode,
the first control unit deletes a path that passes through the communication node for which the request for stopping the communication node has been made, after completion of the change in the setting of the communication node belonging to the second hierarchical network by the second control unit.
<Tenth Mode>
In the communication system in any one of the first to ninth modes,
the communication node(s) belonging to the first hierarchical network comprises (comprise) optical router(s) and/or optical cross-connect apparatus(es); and
the second hierarchical network performs packet forwarding, using an optical path(s) set between the optical router(s) or the optical cross-connect apparatus(es).
<Eleventh Mode>
In the communication system in the tenth mode,
the first control unit comprises:
a first control information generation unit configured to generate control information to be set in each of the optical routers or the optical cross-connect apparatuses and to update the topology of the second hierarchical network formed by the optical routers and/or the optical cross-connect apparatuses; and
a first control information setting unit configured to set the control information in the optical router; and
the second control unit comprises:
a second control information generation unit configured to generate control information to be set in the communication node(s) belonging to the second hierarchical network, based on the topology of the second hierarchical network and a predetermined packet processing policy; and
a second control information setting unit configured to set the control information in the communication node(s) belonging to the second hierarchical network.
<Twelfth Mode>
(See the control apparatus according to the second aspect described above).
<Thirteenth Mode>
(See the control method of a communication system according to the third aspect described above).
<Fourteenth Mode>
(See the program according to the fourth aspect described above).
The twelfth to fourteenth modes described above can be developed into the second to eleventh modes, like the first mode.

Each disclosure of the above-listed Patent Literature and Non Patent Literatures is incorporated herein by reference. Modification and adjustment of each exemplary embodiment and each example are possible within the scope of the overall disclosure (including the claims) of the present invention and based on the technical concept of the present invention. Various combinations and selections of various disclosed elements (including each element in each claim, each element in each exemplary embodiment and each example, and each element in each drawing) are possible within the scope of the claims of the present invention. That is, the present invention naturally includes various variations and modifications that could be made by those skilled in the art according to the overall disclosure including the claims and the technical concept. In particular, it should be interpreted that an arbitrary numerical value and an arbitrary small range included in a numerical value range described herein is specifically described unless otherwise stated herein. In the present disclosure, the singular form will represent also the plural form as the case is pertinent.

11 request receiving unit
12 first control unit
22 second control unit
30 upper layer topology DB (logical topology DB)
30A logical topology
91 first hierarchical network
92 second hierarchical network
111 wavelength processing policy analysis unit
112 lower layer topology (physical topology) DB
113 wavelength control information generation unit
114 wavelength control information DB (optical path DB)
115 wavelength control information setting unit
116 lower layer NW status acquisition unit
117 lower layer NW status DB
118 lower layer management unit
211 packet processing policy DB
213 packet control information generation unit
214 packet control information DB
215 packet control information setting unit
216 upper layer NW status acquisition unit
217 upper layer NW status DB
218 upper layer management unit

What is claimed is:
1. A control apparatus, comprising:
a first controller configured to change a setting of at least one communication node belonging to a first hierarchical network and to change a topology of a second hierarchical network formed by using the first hierarchical network, in response to a setting request for the first hierarchical network; and
a second controller configured to change a setting of at least one communication node belonging to the second hierarchical network, using the topology of the second hierarchical network after the change,
wherein the communication node belonging to the first hierarchical network comprises at least one optical router and an optical cross-connect apparatus, and
wherein the second hierarchical network performs a packet forwarding, using at least one optical path set between the at least one optical router and the optical cross-connect apparatus,
wherein the first controller comprises:
a first control information generation unit configured to generate control information to be set in each of the optical routers or the optical cross-connect apparatuses and to update the topology of the second hierarchical network formed by the optical routers or the optical cross-connect apparatuses; and a first control information setting unit configured to set the control information in the optical router, and wherein the second controller comprises:

a second control information generation unit configured to generate control information to be set in the at least one communication node belonging to the second hierarchical network, based on the topology of the second hierarchical network and a predetermined packet processing policy; and a second control information setting unit configured to set the control information in the at least one communication node belonging to the second hierarchical network.

2. A communication system, including:

a first controller configured to change a setting of at least one communication node belonging to a first hierarchical network and to change a topology of a second hierarchical network formed by using the first hierarchical network, in response to a setting request for the first hierarchical network; and a second controller configured to change a setting of at least one communication node belonging to the second hierarchical network, using the topology of the second hierarchical network after the change, wherein the first controller changes the setting of the at least one communication node belonging to the first hierarchical network and changes the topology of the second hierarchical network, in response to a request from the second controller or a user.

3. The communication system according to claim 2, wherein the first controller sets an alternative path in the second hierarchical network according to the request from the user for stopping the communication node belonging to the first hierarchical network.

4. The communication system according to claim 3, wherein the first controller deletes a path that passes through the communication node for which the request for stopping the communication node has been made, after completion of the change in the setting of the communication node belonging to the second hierarchical network by the second controller.

5. A communication system, including:

a first controller configured to change a setting of at least one communication node belonging to a first hierarchical network and to change a topology of a second hierarchical network formed by using the first hierarchical network, in response to a setting request for the first hierarchical network; and a second controller configured to change a setting of at least one communication node belonging to the second hierarchical network, using the topology of the second hierarchical network after the change, wherein the first controller further comprises a first management unit configured to notify the change of the topology of the second hierarchical network to the second controller, and wherein the second controller further comprises a second management unit configured to request the first controller to add a path to the first hierarchical network.

6. A communication system, including:

a first controller configured to change a setting of at least one communication node belonging to a first hierarchical network and to change a topology of a second hierarchical network formed by using the first hierarchical network, in response to a setting request for the first hierarchical network; and a second controller configured to change a setting of at least one communication node belonging to the second hierarchical network, using the topology of the second hierarchical network after the change, wherein the first controller adds a new path between start and end points notified from the second controller.

7. The communication system according to claim 6, wherein the second controller selects a replacement target path from among upper layer paths that uses a lower layer path specified from the first controller, and notifies start and end points of the replacement target path to the first controller.

8. The communication system according to claim 7, wherein the first controller further comprises:

a first status acquisition unit configured to obtain a status of the first hierarchical network, and wherein the first controller specifies to the second controller the lower layer path for which the replacement target path is demanded, based on the status of the first hierarchical network.

9. The communication system according to claim 6, wherein the second controller further comprises:

a second status acquisition unit configured to obtain a status of the second hierarchical network, and wherein the second controller determines the start and end points to be specified to the first controller, based on the status of the second hierarchical network.

10. A communication system, including:

a first controller configured to change a setting of at least one communication node belonging to a first hierarchical network and to change a topology of a second hierarchical network formed by using the first hierarchical network, in response to a setting request for the first hierarchical network; and a second controller configured to change a setting of at least one communication node belonging to the second hierarchical network, using the topology of the second hierarchical network after the change, wherein the at least one communication node belonging to the first hierarchical network comprises at least one of an optical router and an optical cross-connect apparatus, and wherein the second hierarchical network performs packet forwarding, using at least one optical path set between the at least one of the optical router and the optical cross-connect apparatus.

11. The communication system according to claim 10, wherein the first controller comprises:

a first control information generation unit configured to generate control information to be set in each of the optical routers or the optical cross-connect apparatuses and to update the topology of the second hierarchical network formed by the at least one of the optical router and the optical cross-connect apparatus, and a first control information setting unit configured to set the control information in the optical router, and wherein the second controller comprises:

a second control information generation unit configured to generate control information to be set in the at least one communication node belonging to the second hierarchical network, based on the topology of the second hierarchical network and a predetermined packet processing policy; and a second control information setting unit configured to set the control information in the at least one communication node belonging to the second hierarchical network.

12. A control apparatus, comprising:
- a first controller configured to change a setting of at least one communication node belonging to a first hierarchical network and to change a topology of a second hierarchical network formed by using the first hierarchical network, in response to a setting request for the first hierarchical network; and
- a second controller configured to change a setting of at least one communication node belonging to the second hierarchical network, using the topology of the second hierarchical network after the change,
- wherein the first controller changes the setting of the at least one communication node belonging to the first hierarchical network and changes the topology of the second hierarchical network, in response to the request from the second controller or a user.

13. The control apparatus according to claim 12, wherein the first controller sets at least one alternative path in the logical network according to the request from the user for stopping the communication node belonging to the first hierarchical network.

14. The control apparatus according to claim 13, wherein the first controller deletes a path that passes through the communication node for which the request for stopping the communication node has been made, after completion of the change in the setting of the communication node belonging to the second hierarchical network by the second controller.

15. A control apparatus, comprising:
- a first controller configured to change a setting of at least one communication node belonging to a first hierarchical network and to change a topology of a second hierarchical network formed by using the first hierarchical network, in response to a setting request for the first hierarchical network; and
- a second controller configured to change a setting of at least one communication node belonging to the second hierarchical network, using the topology of the second hierarchical network after the change,
- wherein the first controller further comprises a first management unit configured to notify the change of the topology of the second hierarchical network to the second controller, a and
- wherein the second controller further comprises a second management unit configured to request the first controller to add at least a path to the first hierarchical network.

16. A control apparatus, comprising:
- a first controller configured to change a setting of at least one communication node belonging to a first hierarchical network and to change a topology of a second hierarchical network formed by using the first hierarchical network, in response to a setting request for the first hierarchical network; and
- a second controller configured to change a setting of at least one communication node belonging to the second hierarchical network, using the topology of the second hierarchical network after the change,
- wherein the first controller adds at least a new path between start and end points notified from the second controller.

17. The control apparatus according to claim 16, wherein the second controller selects a replacement target path from among upper layer paths that uses a lower layer path specified from the first controller, and notifies start and end points of the replacement target path to the first controller.

18. The control apparatus according to claim 17, wherein the first controller further comprises:
- a first status acquisition unit configured to obtain a status of the first hierarchical network,
- wherein the first controller specifies to the second controller the lower layer path for which the replacement target path is demanded, based on the status of the first hierarchical network.

19. The control apparatus according to claim 16, wherein the second controller further comprises:
- a second status acquisition unit configured to obtain a status of the second hierarchical network,
- wherein the second controller determines the start and end points to be specified to the first controller, based on the status of the second hierarchical network.

* * * * *

UNITED STATES PATENT AND TRADEMARK OFFICE
CERTIFICATE OF CORRECTION

PATENT NO. : 9,641,397 B2
APPLICATION NO. : 14/429749
DATED : May 2, 2017
INVENTOR(S) : Kazuya Suzuki et al.

Page 1 of 1

It is certified that error appears in the above-identified patent and that said Letters Patent is hereby corrected as shown below:

In the Claims

1. In Claim 1, Line 56, be changed from "router and an optical cross-connect apparatus, and" to "router and an optical cross-connect apparatus,".

2. In Claim 15, Line 42, be changed from "second controller, a and" to "second controller, and".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*